(12) United States Patent
Allart et al.

(10) Patent No.: US 6,293,100 B1
(45) Date of Patent: Sep. 25, 2001

(54) HYDRAULIC ENGINE WITH COMPACT BRAKE

(75) Inventors: Bernard Allart, Crepy-en-Valois; Louis Bigo, Compiegne; Marc Perot, Eve; Alain Noel, Verberie, all of (FR)

(73) Assignee: Poclain Hydraulics Industrie, Verberie (FR)

(*) Notice: Subject to any disclaimer, the term of this patent is extended or adjusted under 35 U.S.C. 154(b) by 0 days.

(21) Appl. No.: 09/462,050
(22) PCT Filed: Jul. 6, 1998
(86) PCT No.: PCT/FR98/01435
  § 371 Date: Dec. 30, 1999
  § 102(e) Date: Dec. 30, 1999
(87) PCT Pub. No.: WO99/02854
  PCT Pub. Date: Jan. 21, 1999

(30) Foreign Application Priority Data

Jul. 7, 1997 (FR) .................................................. 97 08578
Jun. 29, 1998 (FR) .................................................. 98 08209

(51) Int. Cl.$^7$ .................................................. F16D 31/02
(52) U.S. Cl. .................................................. 60/442; 91/498
(58) Field of Search .................................. 91/19, 20, 22, 91/28, 498; 60/441, 442

(56) References Cited

U.S. PATENT DOCUMENTS 3,690,097  9/1972  Widmaier .
5,209,064 * 5/1993  Noel et al. .............................. 60/442
5,855,115 * 1/1999  Martin .................................... 60/437

FOREIGN PATENT DOCUMENTS 0335255  10/1989  (EP) .
2644210   9/1990  (FR) .
2739418   4/1997  (FR) .

* cited by examiner

Primary Examiner—Edward K. Look
Assistant Examiner—Thomas E. Lazo
(74) Attorney, Agent, or Firm—Ladas & Parry (57) ABSTRACT

A hydraulic motor (1) comprising a casing (2A, 2B) a reaction member having a reaction profile (4), a cylinder block (6), an internal fluid distributor (16) suitable for putting the cylinders (12) of the cylinder block (6) in communication with fluid feed and exhaust ducts, and a braking system which comprises first and second braking elements (42, 44), constrained to rotate respectively with the reaction member (4) and with the cylinder block (6). The braking system further comprises a brake piston (40) suitable for being displaced axially so as to urge the braking elements into braking contact or so as to enable braking to be released. The brake piston is constrained to rotate with the casing about the axis of rotation, and it has a substantially radial active face, a first brake member (42) belonging to the first braking means being integral with said active face.

16 Claims, 7 Drawing Sheets

HYDRAULIC ENGINE WITH COMPACT BRAKE

The present invention relates to a hydraulic motor comprising:

a casing;

a reaction member integral with or secured to the casing and having an internal periphery that defines a reaction profile; and a cylinder block which is mounted so that the cylinder block and the reaction member rotate relative to each other about an axis of rotation, the cylinder block comprising a plurality of piston-and-cylinder sets disposed radialy relative to the axis of rotation and suitable for being fed with fluid under pressure;

an internal fluid distributor constrained to rotate with the casing about the axis of rotation, and provided with distribution ducts that can put the cylinders in communication with fluid feed and exhaust ducts; and a braking system comprising first and second braking means constrained to rotate respectively with the casing and with the cylinder block about the axis of rotation, a brake piston suitable for taking up both a brake-releasing position and a braking position in which it urges the first and second braking means into braking engagement so as to prevent the cylinder block and the casing from rotating relative to each other, and means for displacing the brake piston between said braking and brake-releasing positions.

The invention applies more particularly to motors in which the brake acts as a parking brake or as a safety brake, i.e. in which the brake acts without dissipating energy and below a predetermined speed, which varies depending on the embodiment, and which is about 100 revolutions per minute (r.p.m.) on average.

In known motors of the above-mentioned type, the first braking means are generally constituted by a first series of brake pads in the form of rings which are secured to a portion of the casing referred to as the "brake casing", via axial fluting. The brake casing is fixed to the other portions of the casing by screws or any other suitable securing means. The second braking means are constituted by a second series of brake pads in the form of rings interposed between the pads of the first series, and constrained to rotate with a brake shaft by means of axial fluting. The brake shaft is itself constrained to rotate with the cylinder block by means of fluting. The brake piston is disposed in the brake casing, at one end thereof. It is generally urged in the braking direction by a spring washer, and it is hydraulically displaced in the brake-releasing direction by means of a fluid under pressure contained in a brake release chamber.

Such known systems are generally satisfactory but they suffer from several drawbacks.

Firstly, they are made up of quite a large number of parts that are difficult to assemble together. In addition, during braking or during brake release, the piston can "slip" relative to the brake disk that is closest to it. Furthermore, brake disks are subjected to considerable stress from the braking torque. They must be extremely strong in the region of the fluting, in which region the stresses are extremely high because of the smallness of the contact areas between the fluting on the disks and the fluting on the part (the brake casing or the brake shaft) to which they are secured.

An object of the invention is to improve known systems so as to provide safe and effective braking with a small number of parts, or, at least, with parts whose dimensioning and method of assembly are such that they make it possible to limit the manufacturing cost of the "brake" portion of the motor.

This object is achieved by the fact that the brake piston is constrained to rotate with the casing about the axis of rotation and it has a substantially radial active braking face, a first brake member belonging to the first braking means being integral with or secured to said active face.

As described below, constraining the brake piston to rotate with the casing may be achieved by keying it by means of coupling profiles provided with fluting, or, preferably, with undulations which are free from sharp edges or angles. The undulations form a curve whose tangent can be determined at all points. The brake piston is a part of relatively large dimensions (in particular of large thickness), so that achieving the keying poses no particular difficulty.

The brake piston or the coupling profiles can easily be organized to withstand high braking torque. The first brake member is integral with or secured to the active face of the piston, which means that it is either directly constituted by said active face, or it is machined in said active face, or else it is formed by a separate part (a series of teeth of a positive clutch, or a first brake pad) which is fixed to said active face by any known means.

In which case, it is easy to choose the fixing means, e.g. welding, so that they withstand the braking torque. In addition, it is easy to ensure that the contact areas between the first brake member and the braking piston are relatively large (these areas are formed on radial faces), so that the stresses to which the coupling between the first brake member and the piston is subjected on braking are proportionally less high than the stresses to which the coupling between the first disk and the part (casing or brake shaft) with which it is constrained to rotate is subjected in conventional systems.

Advantageously, the first and second braking means respectively comprise a first series of positive clutch teeth and a second series of positive clutch teeth, the first series of teeth being integral with or secured to the active face of the brake piston.

In which case, motor manufacture and motor assembly are made even simpler. The first series of teeth may be machined directly on the active face of the brake piston, or else they may be provided on an annular ring, itself fixed to the brake piston. Similarly, the second series of teeth may be machined directly on a radial face of the cylinder block or on some other part that is prevented from rotating relative to the cylinder block, or else they may be formed on an annular ring fixed to the cylinder block or to some other part. In addition, the forces involved on braking, which forces affect the first braking means (first series of teeth) are transmitted in full to the casing by means of the brake piston being constrained to rotate with said casing.

Preferably, the motor includes a coupling collar which forms a portion of the casing and which has an internal axial face with which an external axial face of the brake piston co-operates to key said piston so that it is constrained to rotate with the casing, said internal and external axial faces having coupling profiles suitable for this purpose.

The coupling collar is advantageously directly adjacent to the reaction member and it may even be constituted by an axial extension of the reaction member, which extension is integral with said reaction member.

In which case, the coupling profile of the internal axial face of the coupling collar is chosen to be analogous to the reaction profile. Thus, since the reaction member is correctly dimensioned to transmit the drive torque, it is guaranteed that the members via which the braking torque passes are also correctly dimensioned. In addition, the machining of the coupling profile formed on the internal axial face of the coupling collar is simplified because it makes use of at least some of the lobes of the cam.

The coupling collar may also be constituted by an annular part which is interposed between the reaction member and the "distribution cover" portion of the casing, which portion surrounds the distributor. In which case, it is very simple to fix the coupling collar to the other portions of the casing. In addition, the brake piston is then situated in an annular space provided around the distributor under the collar, so that the overall axial size of the motor is reduced. Even in this case, it is advantageous to machine the internal periphery of the coupling collar in a manner such that it is provided with undulations whose trough portions correspond to at least some of the trough portions of the reaction member. This simplifies firstly the angular keying of the coupling collar relative to the reaction member on assembling the casing of the motor. In addition, the undulations in the coupling collar are then naturally dimensioned such that they withstand the high braking torque.

In general, it is advantageous for the coupling collar to be disposed in a manner such that its coupling profile is situated within the axial space occupied by some other part of the motor. In the above-indicated configuration, this profile lies within the axial space occupied by the distributor. In another advantageous variant, the coupling collar may be disposed on the other side of the cylinder block from the distributor, it then being possible for its coupling profile to lie within the axial space occupied by some other part, such as a roller bearing for supporting the casing as it rotates relative to the shaft or to the cylinder block.

It is extremely advantageous to make provision to ensure that the portion of the piston that co-operates with the casing (the coupling collar) to constrain the piston to rotate with the casing is distant from the axis of the motor. For example, it may be situated substantially in axial alignment with the reaction profile. The braking torque exerted between the piston and the casing increases as a function of increasing distance between the axis of the rotation of the motor and the mutually-cooperating surfaces (coupling profiles) of the casing and of the piston.

By making provision for these surfaces to be in a region distant from the axis, it is possible to obtain high braking torque with stresses that are lower than those involved in the prior art. This also constitutes an advantage, in particular in terms of braking reliability, and in terms of resistance to wear.

To the same end, it is advantageous to make provision to ensure that the braking means (e.g. the teeth of the positive clutch) via which the braking torque passes are situated in a large-diameter region of the motor, thereby considerably limiting the risks of the parts of the motor wearing prematurely or breaking.

Figure 1:
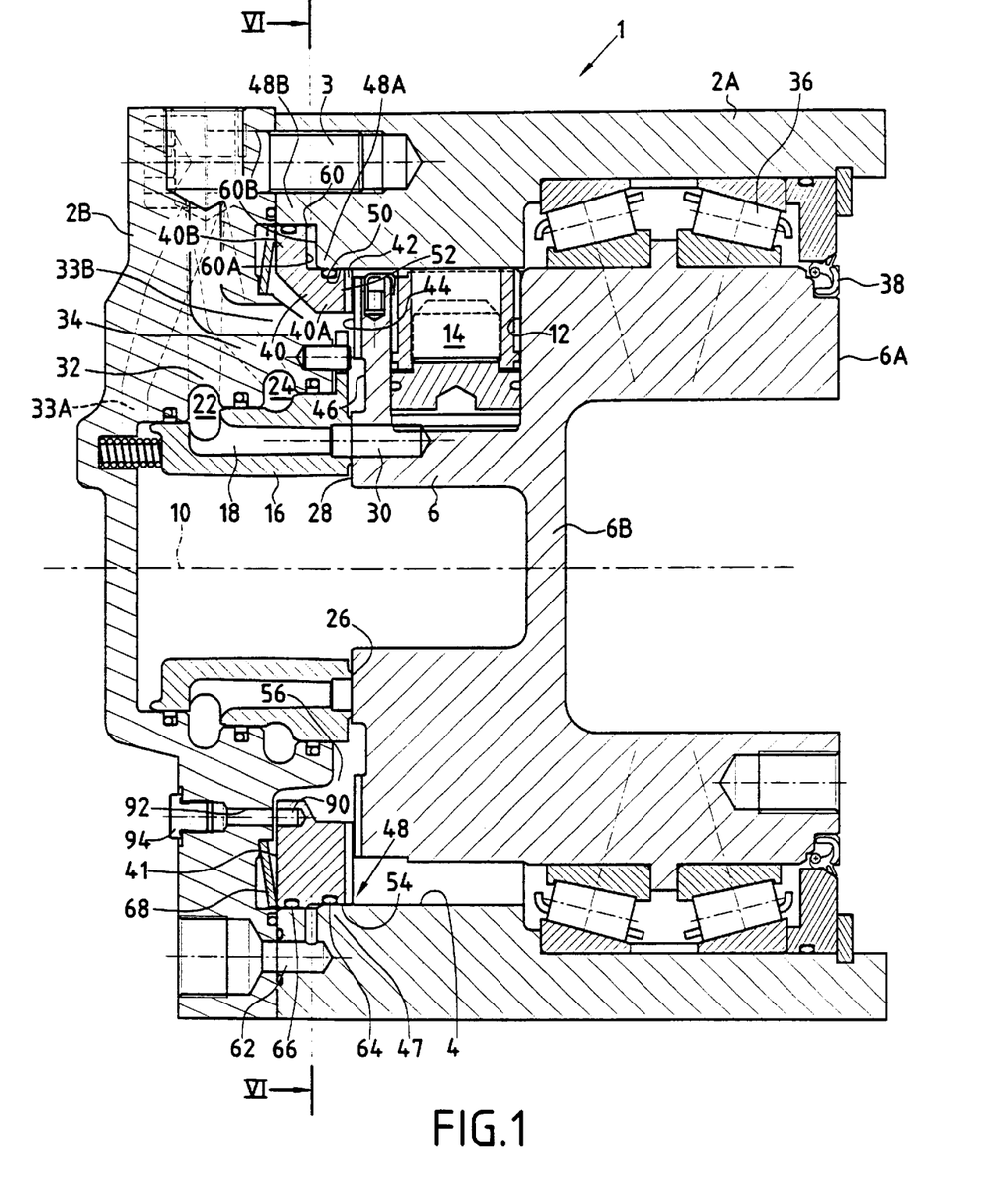
FIG. 1 is an axial section view of a motor according to the invention.

The invention will be well understood, and its advantages will appear more clearly on reading the following detailed description of embodiments given by way of non-limiting example and with reference to accompanying drawings, in which:

FIG. 1 shows a hydraulic motor which includes:

a stationary casing in two portions 2A and 2B, assembled together by means of screws 3;

a reaction member constituted by an undulating reaction cam 4 provided on the portion 2A of the casing;

a cylinder block 6 mounted to rotate relative to the cam 4 about an axis of rotation 10, and comprising a plurality of radial cylinders 12 which are suitable for being fed with fluid under pressure, and in which pistons 14 are slidably mounted; and an internal fluid distributor 16 constrained to rotate with the casing about the axis 10, and provided with distribution ducts 18 suitable for communicating with the cylinders 12.

Grooves 22 and 24 are provided between the internal distributor 16 and the portion 2B of the casing, which portion forms a distribution cover. The distribution ducts open out firstly in one of the grooves (the duct 18 opens out in the groove 22), and secondly in the distribution face 26 of the internal distributor, which face is perpendicular to the axis 10 and abuts against the communication face 28 of the cylinder block. The cylinder ducts 30 open out in said communication face 28 and they are disposed so that they can be put in communication with the distribution ducts when the internal distributor and the cylinder block rotate relative to each other.

The motor shown has only one operating cylinder, only two grooves being provided between the portion 2B of the casing and the internal distributor 16. The grooves are themselves respectively connected to ducts 32 and 34 which open out in an external face of the casing 2B so as to be connected to a hydraulic fluid circuit. Depending on the rotation direction of the motor, the ducts 32 and 34 may perform a fluid feed function or a fluid exhaust function. Conical roller bearings 36 support the cylinder block so that it can rotate relative to the portion 2A of the casing.

It is to be understood that the invention also applies to a motor having a plurality of distinct operating cylinders.

Leakage return ducts 33A and 33B are also provided in the portion 2B of the casing.

The motor having a stationary casing as shown in FIG. 1 has no shaft distinct from the cylinder block. That end face 6A of the cylinder block which is further from the portion 2B of the casing constitutes the outlet of the motor, and, by means of tapped holes suitable for co-operating with screws (not shown), this end of the cylinder block can be fixed directly to an object to be driven in rotation.

The cylinder block is not bored through, but rather it has a transverse wall 6B which closes off the inside space of the motor from the outside, the inside space being sealed with a sealing gasket 38.

Naturally, this cylinder block configuration merely constitutes an example, and it is possible to provide some other configuration, with a shaft being constrained to rotate with the cylinder block by means of axial fluting.

The motor 1 further includes a braking system which comprises a brake piston 40 having a radial end face (its "active face") which is provided with first braking means constituted by a first series of teeth 42 of a positive clutch, while the second braking means 44 are constituted by the second series of teeth of the positive clutch, which series is integral with or secured to a radial end face 46 of the cylinder block 6, which face is situated facing the radial end face of the piston 40. The series of teeth 42 and 44 thus face each other, and it can be understood that, when the piston is displaced towards the cylinder block, they engage one another so as to brake the cylinder block relative to the casing-and-cam assembly, i.e. so as to prevent the cylinder block from moving relative to said assembly. When the piston 40 is moved away from the cylinder block, the teeth are in the brake-releasing position, and they enable the cylinder block 6 to rotate relative to the casing 2A. The teeth of the series 42 and 44 are angularly positioned radially and they form axially-extending pieces of relief.

Since it is integral with or secured to the end face 46 of the cylinder block, the second series of teeth 44 is naturally constrained to rotate with the cylinder block about the axis 10. In order to constrain the first series of teeth 42 to rotate with the casing of the motor, that portion 2A of the casing which carries the cam is provided with an axial extension 48 forming a coupling collar which has an axial segment forming a first coupling segment 47 that has an internal periphery that defines an internal profile 50 analogous to the profile of the cam 4. For example, the internal profile 50 may be identical to the profile of the cam 4 and, as shown in FIG. 1, merely consists of an axial extension to the surface of the cam 4 beyond the end face 46 of the cylinder block 6.

In order to co-operate with the internal profile 50, the brake piston 40 is provided with a second coupling segment 52 which, on its external axial face, defines an external profile 54 which matches the internal profile 50. When the motor is assembled, the piston is disposed so that the second coupling segment 52 is disposed inside the first coupling segment 47, the external profile 54 co-operating with the internal profile 50 to constrain the brake piston 40 to rotate with the portion 2A of the casing.

For example, the internal profile may be identical to the reaction profile, and constitute an axial extension thereto, while the external profile may be exactly complementary to the internal profile.

In FIG. 1, the brake piston 40 and the axial extension 48 of the reaction member, in which extension the first coupling segment 47 is provided, are situated on that side of the cylinder block 6 which faces the internal fluid distributor 16.

The braking system is thus formed substantially without increasing the overall axial size of the motor, because the brake piston 40 is disposed in an annular cavity 56 provided above the internal distributor 16, under the portion 2A of the casing. In a variant, it is possible to choose to dispose the brake piston on the other side of the cylinder block, thereby increasing the overall axial size of the motor somewhat. This variant can however be advantageous, e.g. when the bearings that support the cylinder block so that it can rotate relative to the casing are provided in separate parts that are fixed respectively to the cylinder block and to the casing.

Concerning the roller bearings 36, it should be noted that the example given in FIG. 1 shows conical roller bearings, in place of which it may be preferred to use bearings having spherical balls rolling in tracks and having four contact points, which also constitutes an advantage from the axial compactness point of view.

In order to cause the brake piston 40 to be displaced in the break-releasing direction, the motor is provided with a brake release chamber 60 which is suitable for being fed with a fluid under pressure via a brake release duct 62.

This chamber has a substantially radial wall which is formed by a face 60A of the piston, which face faces the same way as the active face of said piston (the active face being the face which carries the series of teeth 42) and is offset axially relative to the active face (away from the second series of teeth 44).

The brake release chamber is formed between two stepped portions, respectively 48A and 48B, belonging to the axial extension 48 of the reaction member, and two stepped axial portions, respectively 40A and 40B, belonging to the brake piston. The external periphery of the axial portion 40A co-operates with the internal profile of the axial portion 48A, the sliding contact between said internal periphery and said external periphery being sealed by a sealing gasket 64. Similarly, the external axial periphery of the portion 40B co-operates with the internal axial periphery of the portion 48B, this sliding contact being sealed by a second sealing gasket 66.

In the example shown in FIG. 1, the portion 40A of the piston constitutes the second coupling segment 52, and the portion 48A of the axial extension 48 carries the internal profile 50 of the first coupling segment 47. The profiles 50 and 54 thus act both as transmission surfaces for transmitting the braking torque (to this end, they have profiles identical or analogous to the profile of the cam) and also as guiding surfaces for guiding the piston as it slides, while being sealed from each other by means of gasket 64. In the example shown in FIG. 1, in order to make this sealed contact possible, the internal profile 50 and the external profile 54 are exactly complementary, i.e. they have the same undulations of complementary shape and interfitting snugly with one another with almost no clearance. For example, the gasket 64 may be disposed in a groove provided in the profile 54, and its shape also reproduces the undulations of the internal and external profiles, with constant thickness.

The external profile of the portion 40B of the piston 40 and the internal periphery of the portion 48B of the axial extension 48 are cylindrical and have no undulations, their radius being slightly greater than the largest radius of the cam profile. In the top half of FIG. 1, the axial section includes the summit of a convex portion of the cam, in which portion the radius of said cam is at its minimum. It can be seen that, at this place, the chamber 60 has radial walls, respectively 60A and 60B of relatively large dimensions. In the bottom half of FIG. 1, the section includes the bottom of a concave surface of the cam, in which surface the radius of the cam is at its maximum, and it can be seen that the radial walls 60A and 60B of the chamber are almost nonexistent in this region. For example, the gasket 66 may be disposed in a groove provided in the external periphery of the portion 40B of the piston and, insofar as it is to provide sealing between two cylindrical surfaces, it is of the conventional ring shape.

When the chamber 60 is fed with fluid under pressure, said fluid tends to push the piston back in the brake-releasing direction because of the forces that it exerts respectively on the radial walls 60A and 60B. The piston is returned in the braking direction by a spring washer 68 which bears firstly against the brake release casing 2B, and secondly against that face of the piston which faces away from the cylinder block.

Figure 2:
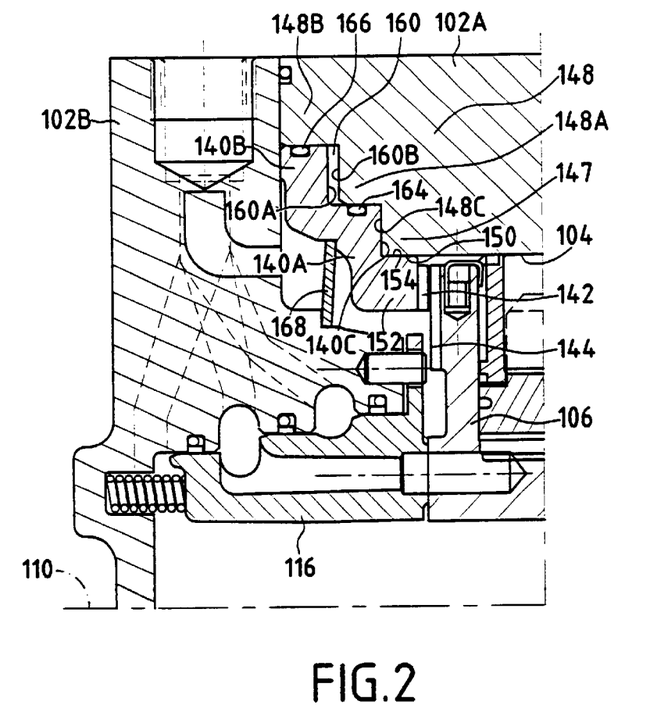
FIGS. 2 to 5 are fragmentary axial section views showing variants of the motor shown in FIG. 1.

FIG. 2 shows a variant embodiment which makes it possible to avoid giving one of the gaskets that seals the brake release chamber an undulating shape. This figure uses the same references as those in FIG. 1, plus 100. The brake release chamber 160 is formed between the axial portions 148A and 148B of the coupling collar formed by the axial extension 148 and the axial portions 140A and 140B of the brake piston 140. However, the external peripheries of the portions 140A and 140B, as well as the internal peripheries of the portions 148A and 148B are cylindrical, the staggering between the axial portions giving the chamber radial walls 160A and 160B that are of constant height throughout the chamber. To achieve this, the first axial portion 148A of the axial extension 148 (the portion that is closer to the cylinder block 106) is connected to the first coupling segment 147 via a setback 148C which forms the transition between the undulating shape of the internal profile 150 constituting the internal periphery of the coupling segment 147 and the cylindrical shape of the internal periphery of the portion 148A. Similarly, the first axial portion of the brake piston 140A is connected to the second coupling segment 152 via a shoulder 140C which forms the transition between the undulating shape of the external profile 154 formed by the external periphery of the coupling segment 152 and the cylindrical external periphery of the portion 140A. Thus, the gaskets 164 and 166 which seal the brake release chamber are of conventional ring shape.

The setback 148C and the shoulder 140C may be present only in the regions corresponding to the convex zones of the cam 104, it being possible for the radius of the cylindrical surfaces of the internal periphery of the portion 148A and of the external periphery of the portion 140A to be substantially equal to the maximum radius of the cam at the bottoms of its concave zones.

Figure 3:
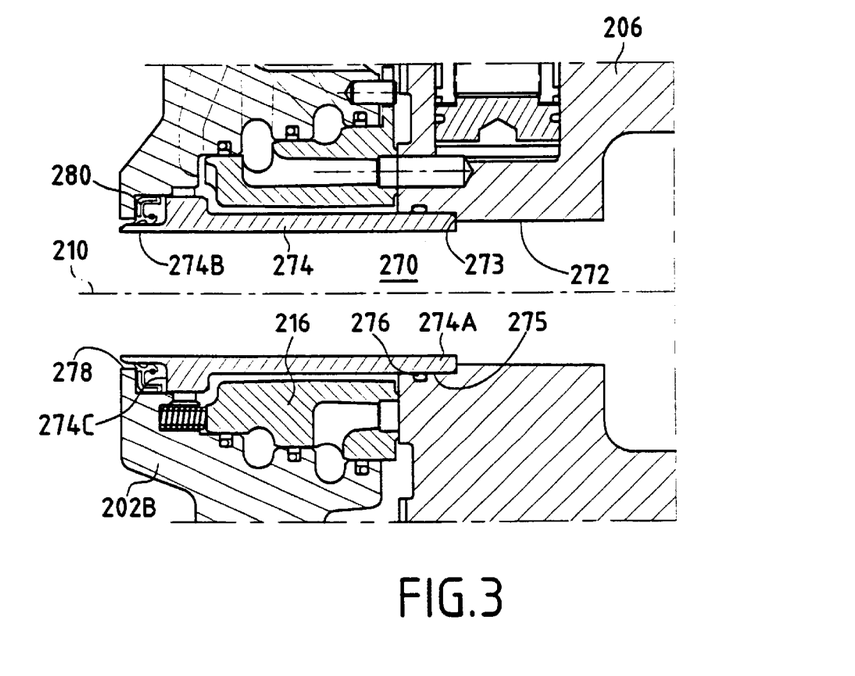

In the variant shown in FIG. 3, the motor is organized to have a through central recess. A configuration of this type is particularly advantageous for certain applications, in particular for those in which the motor is used to drive a drill bit, in which case the through recess in the motor constitutes a passageway via which the drilling mud is removed. This configuration is also particularly advantageous when it is necessary to provide a passageway for members of plant or tools driven by means of the motor, e.g. for pipes conveying fluid or compressed air. It is particularly advantageous to use a motor of this type for driving the compacting rollers of an earth compactor, by making use of the presence of the axial recess to dispose the shaft of a secondary motor.

FIG. 3 uses the same references as in FIG. 1, plus 200.

To form the axial passageway or central recess 270, the cylinder block 206 is provided with a through axial bore 272. That portion of the motor which is distant from the axis 210 is not shown in FIG. 3, and the cylinder block is supported to rotate in the same way as in FIG. 1. Once the axial bore 272 has been provided, the problem consists in closing and sealing the inside space of the motor. For this purpose, a hollow cylindrical sleeve 274 is disposed in the internal distributor 216 so that it extends beyond both of the axial ends of said distributor. More precisely, the hollow cylindrical sleeve is provided with a first axial end 274A which is situated on the side of the distributor that faces towards the cylinder block 206, and which is connected in sealed manner to the wall of the axial bore 272 of the cylinder block. For this purpose, a sealing gasket 276 is disposed between the axial face of the bore 272 and that external axial face 275 of the sleeve 274 which is situated facing said face of the bore.

On the other side of the distributor 216, the second axial end 274B of the sleeve 274 is connected in sealed manner to the wall of an axial bore 278 which passes through the casing or, more precisely, through the potion 202B thereof. Thus, the inside space of the motor is sealed relative to the axial passageway 270. The sleeve 274 may be keyed axially by means of its end 274A co-operating in abutment with a shoulder 273 provided in the bore 272 of the cylinder block. On the other end, abutment keying may be performed by any suitable means using, for example, the shoulder 274C of the external axial face of the sleeve.

Figure 4:
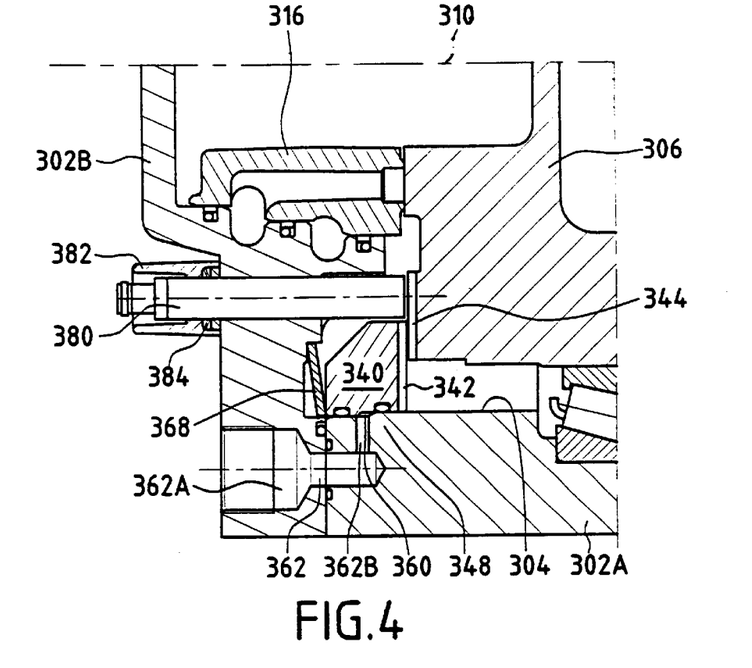

In FIG. 4, the numerical references are the same as those used in FIG. 1, plus 300. FIG. 4 shows an advantageous configuration in which the teeth of the braking positive clutch are used to measure the speed of rotation of the rotor of the motor relative to its stator. For this purpose, a speed detector 380 is received in an element of the stator of the motor, and it faces that one of the first and second series of teeth which is constrained to rotate with the rotor of the motor.

In the example shown, the cylinder block belongs to the rotor and it is thus the second series of teeth 344 that faces the detector 380 in order to measure the speed at which the teeth of the second series go past. The detector is received in a bore provided in the portion 302B of the casing of the motor. The detector 380 is keyed by means of a ring 382, the bore in which it is received being sealed by means of gaskets 384. At its end situated outside the casing of the motor, it may be connected to electrical cables. For example, it may be an optical system or an electromagnetic system. Generally, any system suitable for transmitting a pulse each time a tooth goes past its sensor, so as to enable the teeth going past to be counted, may be provided.

Figure 5:
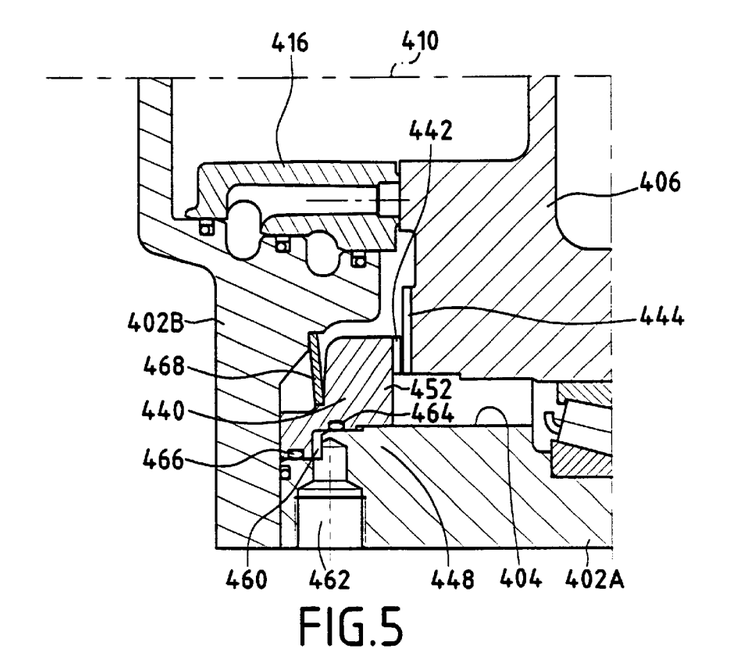

The references used in FIG. 5 are the same as those used in FIG. 1, plus 400. In the preceding figures, e.g. in FIG. 3, the brake release duct opens out outside the motor in a substantially radial face thereof. Thus, the duct 362 in FIG. 4 comprises a first axial segment 362A connected to a second segment 362B which is radial and which opens out in the brake release chamber 360. In the variant shown in FIG. 5, the brake release duct comprises a single radial segment 462 which passes through the axial extension 448 of the cam 404. When the motor has a stationary casing, this configuration makes it possible to simplify the machining of the brake release duct, insofar as it is possible to connect the external brake release pipes to the end of the duct that opens out in an axial face of the portion 402A of the casing of the motor.

FIG. 1 shows that the braking system comprises mechanical brake release means which include an axial tapped hole 90 which is formed in the brake piston 40 and which opens out in a substantially radial face of the piston, which face is situated at the end further from the cylinder block, i.e. at the end opposite from the first teeth 42 of the positive clutch. The brake release means also include an axial bore 92 which is provided in a substantially radial portion of the casing of the motor that is situated facing the brake piston. In this example, the bore 92 is provided in a portion in the form of a radial flange of the distribution cover 2B. the bore 92 is aligned with the axial tapped hole 90. In order to release the braking, a brake release screw (not shown) can be inserted through the axial bore into the tapped hole 90, and, insofar as the head of the screw is held in abutment outside the bore 92, turning the screw in the tightening direction inside the tapped hole 90 causes the brake piston 40 to be returned in the direction opposing the action of the spring washer 68, i.e. in the break-releasing direction. Under usual motor operating conditions, the bore 92 is closed, e.g. by means of a stopper 94. Alternatively, the brake release screw may be pre-inserted into the bore while being held by any suitable means (e.g. a spacer) in a set-back position in which its free end does not extend beyond the end of the bore 92 that faces the tapped hole 90. The mechanical brake release means comprise at least two brake release sets of this type, spaced apart circumferentially.

It is indicated above that the internal profile of the first coupling segment is analogous to the reaction profile of the reaction member, and that the external profile of the second coupling segment matches the internal profile so as to transmit the braking torque. For example, in a first variant, the internal profile may be identical to the reaction profile, and the external profile may be exactly complementary to the internal profile. When the internal and external profiles serve not only to pass on the braking torque but also to define the brake release chamber, as in FIG. 1, the internal and external profiles must be exactly complementary so that sealing can be provided by means of a single gasket which, for example, reproduces the undulations of the cam and is of constant radial thickness.

Figure 6:
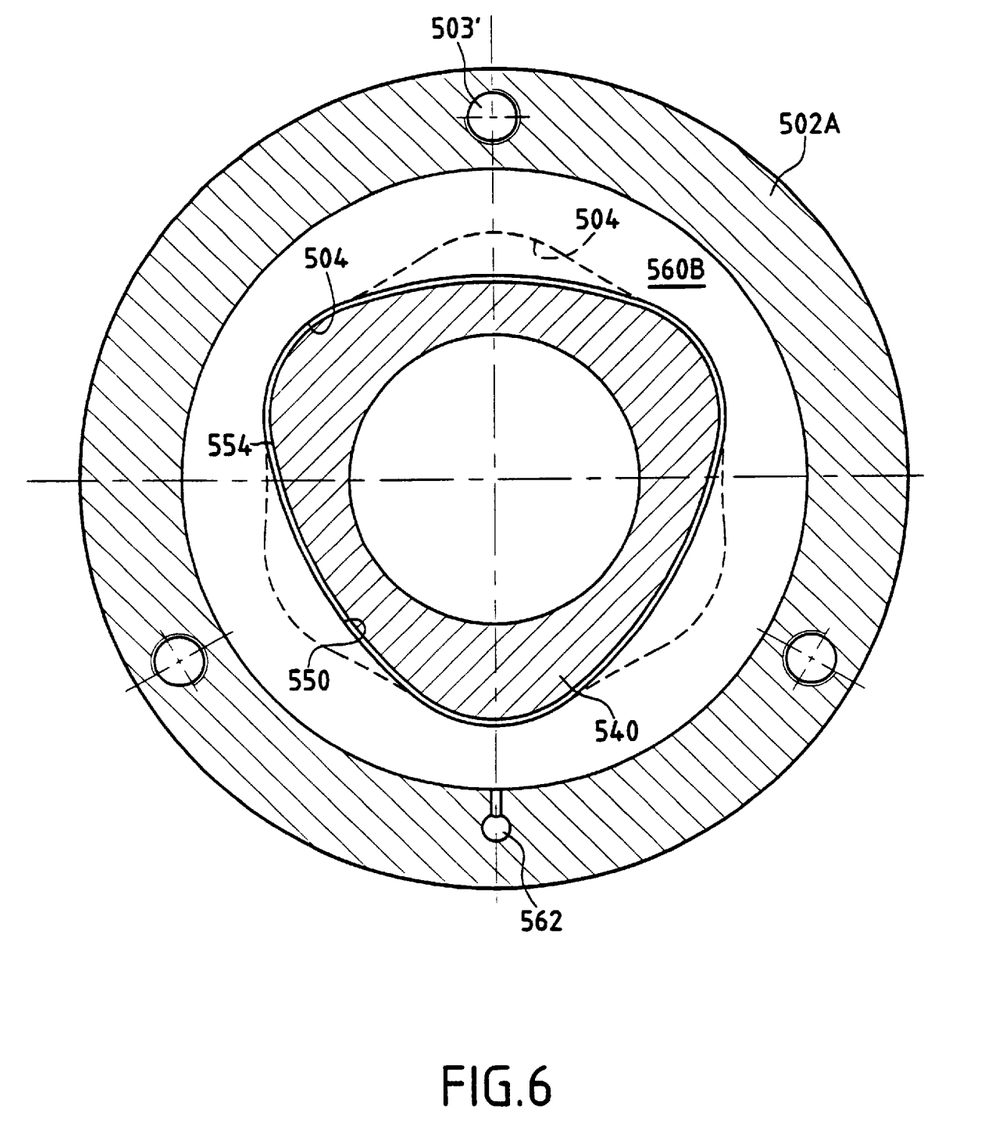
FIG. 6 is a diagrammatic radial section view on line VI—VI of FIG. 1, showing a variant.

It is however possible to obtain this function without the internal profile of the first coupling segment 147 exactly extending the profile of the cam. FIG. 6 is an extremely diagrammatic section view showing such a possibility. In this figure, the cam surface 504 is provided, for example, with six undulations uniformly distributed over its periphery, and formed by machining the internal periphery of the portion 502A of the casing. It is possible for the internal profile 550 of the first coupling segment to be provided with three undulations only, every other lobe of the cam not being reproduced. The brake piston 540 has an external profile 554 which is exactly complementary to the profile 550, so that the two surfaces constituted by the internal profile 550 and by the external profile 554 may be sealed by means of a gasket of constant thickness (for reasons of clarity, the gasket is not shown, and the profiles 550 and 554 are shown spaced apart from each other). For reasons of simplification, the internal elements of the motor such as the distributor which is situated inside the brake piston are not shown in FIG. 6. Similarly, in the portion 502A of the casing, only the brake release duct 562 and the bores 503' for the fixing screws for fixing together the portions of the casing are indicated.

The configuration shown in FIG. 6 is particularly advantageous because, with it being simple to machine the reaction profile and the internal and external profiles that transmit the braking torque, as well as the brake piston, it is possible to increase the brake release surface area. This area is defined by the area of the region in which the two radial faces (60A and 60B in FIG. 1) of the brake release chamber face each other, these faces being respectively defined on the axial extension of the casing and on the brake piston. In the shaping configuration of FIG. 6, the brake release area is equal to the area of the face 560B of the brake release chamber. It can be seen that this area is significantly larger than the brake release area that would be provided if the internal profile were identical to the cam profile, in which case it would be necessary to deduct from the area of the face 560B the shaded portions on FIG. 6 corresponding to half of the cam lobes. By increasing the brake release area in this way, it is possible to increase the effectiveness of the brake release fluid. Effective brake release can thus be obtained with a fluid pressure that is lower or, rather, greater brake release can be obtained for any given fluid pressure, which makes it possible to use a spring that exerts a higher force, thereby making it possible to obtain higher braking torque.

FIG. 6 shows that the coupling profiles of the coupling collar and of the brake piston are advantageously formed by undulations, the trough portions of the undulations of the coupling profile of the internal coupling face of the collar extending axially in register with at least some of the trough portions of the undulations of the reaction member. In other words, at least some of the cam lobes are "used" to form the coupling profiles.

Figure 7:
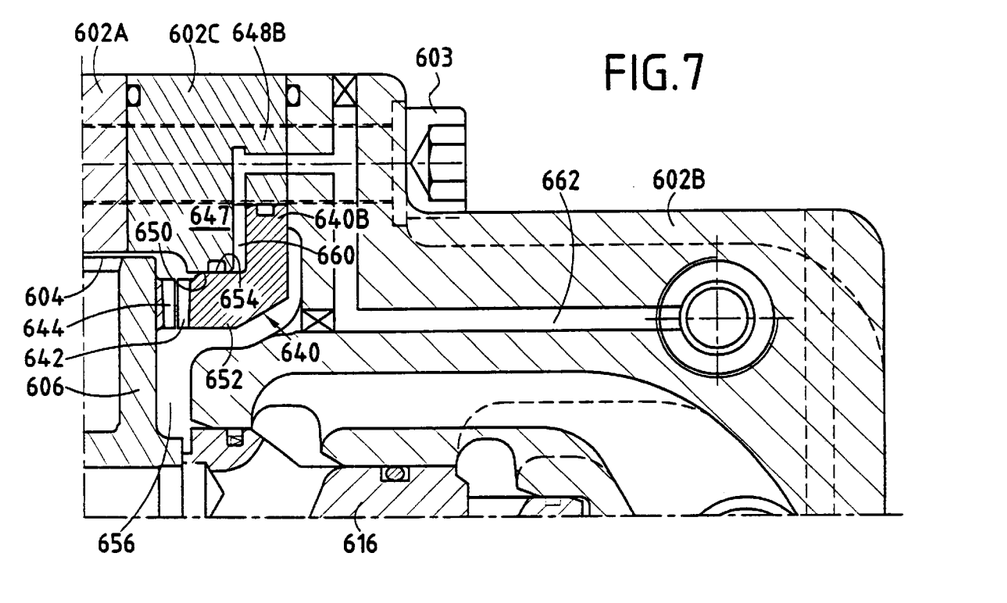
FIG. 7 is a fragmentary axial section view showing another variant of the motor of FIG. 1.

FIG. 7 shows that the casing of the motor is in three portions, respectively 602A (whose internal periphery forms the undulating cam 604), 602B (distribution cover), and 602C. The portion 602C is the coupling collar of which an axial segment forms a coupling segment 647, the internal periphery of said segment defining the internal coupling profile 650. The brake piston 640 includes a second coupling segment 652 whose external axial face 654 has the external coupling profile which, by co-operating with the profile 650, makes it possible to key the piston so that it is prevented from rotating relative to the collar 602C. The collar is disposed between the distribution cover 602B and the portion 602A of the casing that carries the cam. The collar 602C thus extends around a marginal portion of the cylinder block 606 situated on that side of its radial face which faces the distributor 616 (on which face the teeth 644 are situated), and around the portion of the distributor that is adjacent to the cylinder block.

The brake piston 640 is disposed in an annular cavity 656 provided around the distributor, substantially in the same shaping configuration as in FIG. 1.

Unlike the collar in FIG. 1, the collar 602C is not made in one piece with the casing which carries the cam. It is constituted by a distinct part which is fixed to the other portions of the casing by the screws 603 for fixing the casing, these screws naturally being dimensioned to withstand the high torque exerted on the assembly made up of the various portions of the casing during motor operation. While ensuring that the braking assembly is robust, this configuration makes it possible to dispose the same braking assembly on various types of motor (e.g. which differ from one another by the number of cam lobes that they have, or rather, by the amplitude of their cam undulations). As in FIG. 1, the coupling profiles of the faces 650 and 654 are advantageously formed by undulations.

As in FIG. 1, the brake release chamber 660 is formed between two stepped axial portions of the coupling collar 602C and two stepped axial portions of the piston 640. The internal periphery of the axial portion 648B of the coupling collar and the external periphery of the portion 640B of the piston, which peripheries co-operate with each other, may be cylindrical. However, it is also possible to choose to form them in undulating manner so that they couple the piston 640 to the collar 602C to constrain it to rotate therewith. In which case, the external periphery of the axial segment of the piston that is adjacent to the first braking means (teeth 642 provided on the piston) and the internal periphery of the portion of the collar 602C which co-operates with said external periphery may be cylindrical.

The brake release duct 662 may be may be formed in part in the distribution cover 602B and in part in the coupling collar 602C.

Figure 8:
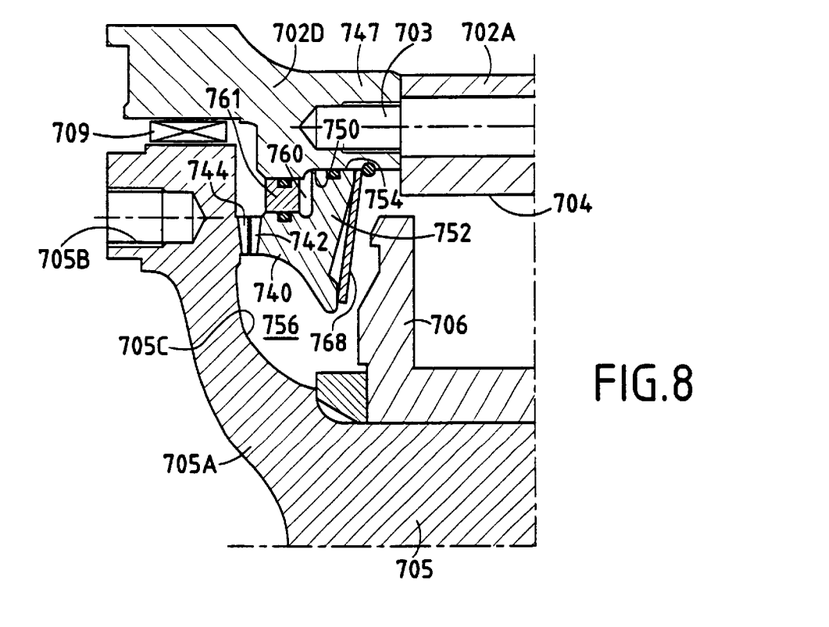
FIG. 8 is a fragmentary axial section view showing yet another variant.

FIG. 8 is an axial section view of the portion of the motor that is situated on the opposite side of the cylinder block from the distributor. It is thus possible to see a portion of the cylinder block 706, part of the casing portion 702A whose internal periphery forms the cam 704, part of another casing portion 702D which is assembled on the portion 702A by casing assembly screws 703, and a shaft 705 which is constrained to rotate with the cylinder block 706 by any suitable means, e.g. by fluting. The shaft 705 includes a radial flange 705A which is supported to rotate relative to the internal periphery of the portion 702D of the casing by a bearing 709 which is shown very diagrammatically, it being possible for this bearing to comprise any type of rolling members, e.g. balls or conical roller bearings. The flange 705A of the shaft 705 is provided with tapped holes 705B which enable it to be fixed to an object that is to be driven in rotation.

The brake piston 740 is disposed in an annular space 756 which, in this configuration, is provided between the portion 702D of the casing and the shaft 705, and which is defined axially by the radial wall of the cylinder block that is further from the distributor (not shown) and by the substantially radial face 705C of the flange 705A that faces towards the radial wall of the cylinder block. The first braking means 742 (first series of teeth) are integral with or secured to the active face 740 of the piston, which active face faces the face 705C of the flange 705A. The second braking means 744 (second series of teeth) are integral with or secured to the said face 705C. The brake piston 740 is constantly urged in the braking direction (i.e. away from the cylinder block 706) by a spring 768 constituted by a Belleville spring washer.

The coupling collar is constituted by the axial segment 747 of the casing portion 702D which is adjacent to the portion 702A. In order to constrain the piston to rotate with the casing, the internal periphery 750 of the collar and the external periphery 754 of the coupling segment 752 of the piston 740 have coupling profiles that preferably form undulations. These profiles are sealed relative to each other because they define the brake release chamber 760. On the other side, in the vicinity of the cylinder block, the chamber 760 is defined by the facing cylindrical axial peripheries of the piston and of the casing portion 702D, which peripheries are also sealed relative to each other.

Figure 9:
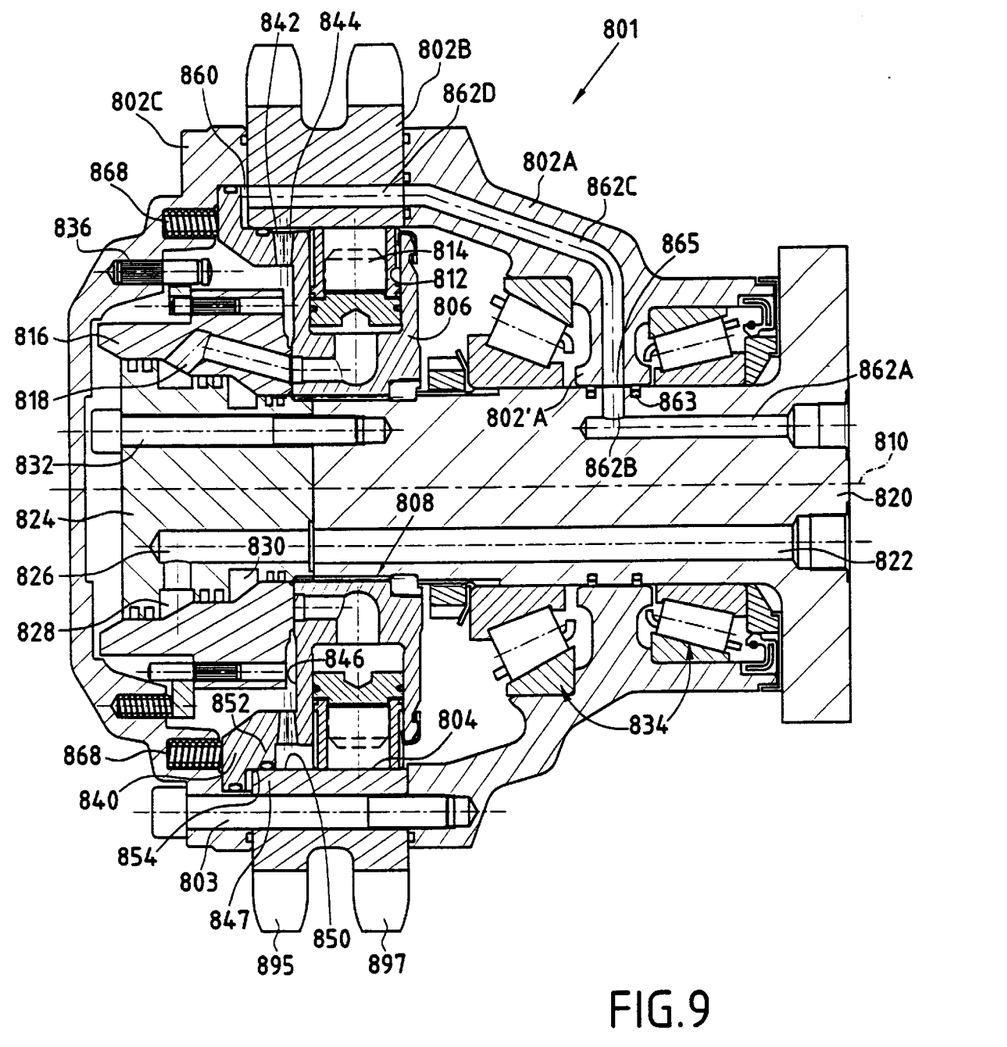
FIG. 9 is an axial section view of another embodiment of a motor according to the invention.

FIGS. 1 to 8 shows the invention as applied to a motor having a stationary casing. FIG. 9 shows that the invention also applies to a motor having a rotary casing. More precisely, the motor 801 comprises:

a rotary casing in three portions 802A, 802B, and 802C assembled together by screws 803;

an undulating reaction cam 804 provided on the internal periphery of the portion 802B of the casing;

a cylinder block 806 which is provided with a central bore 808 and which is prevented from rotating about the axis 810, the cylinder block comprising a plurality of radial cylinders 812 suitable for being fed with fluid under pressure, and inside which pistons 814 are slidably mounted;

an internal fluid distributor 816 constrained to rotate with the casing about the axis 810, i.e. it rotates with the casing relative to the cylinder block, and provided with distribution ducts 818 suitable for communicating with the cylinders 812; and a first central core segment 820 which is stationary and which is provided with fluid feed and exhaust ducts 822, and a second central core segment 824 which, via intermediate ducts 826, puts the fluid feed or exhaust ducts in communication with grooves 828 and 830 provided between its external periphery and the internal periphery of the fluid distributor 816.

The second segment 824 is secured to the first segment 820 by means of screws 832. The cylinder block is secured to the segments 820 and 824 so that they are prevented from rotating by means of fluting provided in its bore 808 and co-operating with complementary fluting provided on the external peripheries of the segments 820 and 824. The casing is supported as it rotates by bearings 834 on the axial periphery of the core segment 820. The distributor 816 is constrained to rotate with the portion 802C of the casing by means of a stud-and-notch system 836.

The braking system that equips the motor is analogous to the system shown in the preceding figures, with the first coupling segment 847 being provided on an axial extension of the reaction member, and the brake piston 840 being provided with the second coupling segment 852. The braking torque is passed on, i.e. the piston and the reaction member are constrained to rotate together, by means of the internal profile 850 of the first coupling segment 847 co-operating with the external profile 854 of the second coupling segment 852.

In the example shown in FIG. 9, the surfaces defined by the internal and external profiles also serve to define the brake release chamber 860, so that the internal and external profiles are complementary. Naturally, it is possible to provide the variants mentioned with reference to the preceding figures. The first braking means are constituted by a first series of teeth 842 which are mounted on one end of the brake piston 840, while the second braking means are constituted by a second series of teeth 844 which are mounted on an end face 846 of the cylinder block that is situated under the axial extension in which the first coupling segment is provided.

The brake release chamber 860 is fed with fluid under pressure via a brake release duct comprising a first segment 862A which is disposed axially in the central core segment 820, a second segment 862B which is disposed radially and which engages in this axial segment to open out in the external axial face of the central core segment 820, and third and fourth segments 862C and 862D. An axial face formed in a transverse flange 802'A of the casing portion 802A faces that region of the axial periphery of the core segment 820 in which the duct 862B opens out. A communication chamber 865 is thus provided, which chamber is sealed on either side of the end of the duct 862B by sealing gaskets 863. The duct segment 862C is provided in the portion 802A of the casing, and it opens out in the chamber 865 to be put permanently in communication with the duct 862B. The segment 862C is connected to the axial segment 862D which is provided in the portion 802B of the casing, this duct 862D opening out in the brake release chamber 860. For the purpose of permanently urging the piston 840 in the braking direction, resilient return means are provided, e.g. constituted by helical springs 868.

It can be noted that the external periphery of the portion 802B of the casing is provided with two sprockets 895 and 897. These sprockets can engage with chains, thereby enabling the motor 801 to be used, for example, for driving compact loader wheels disposed in tandem.

Figure 10:
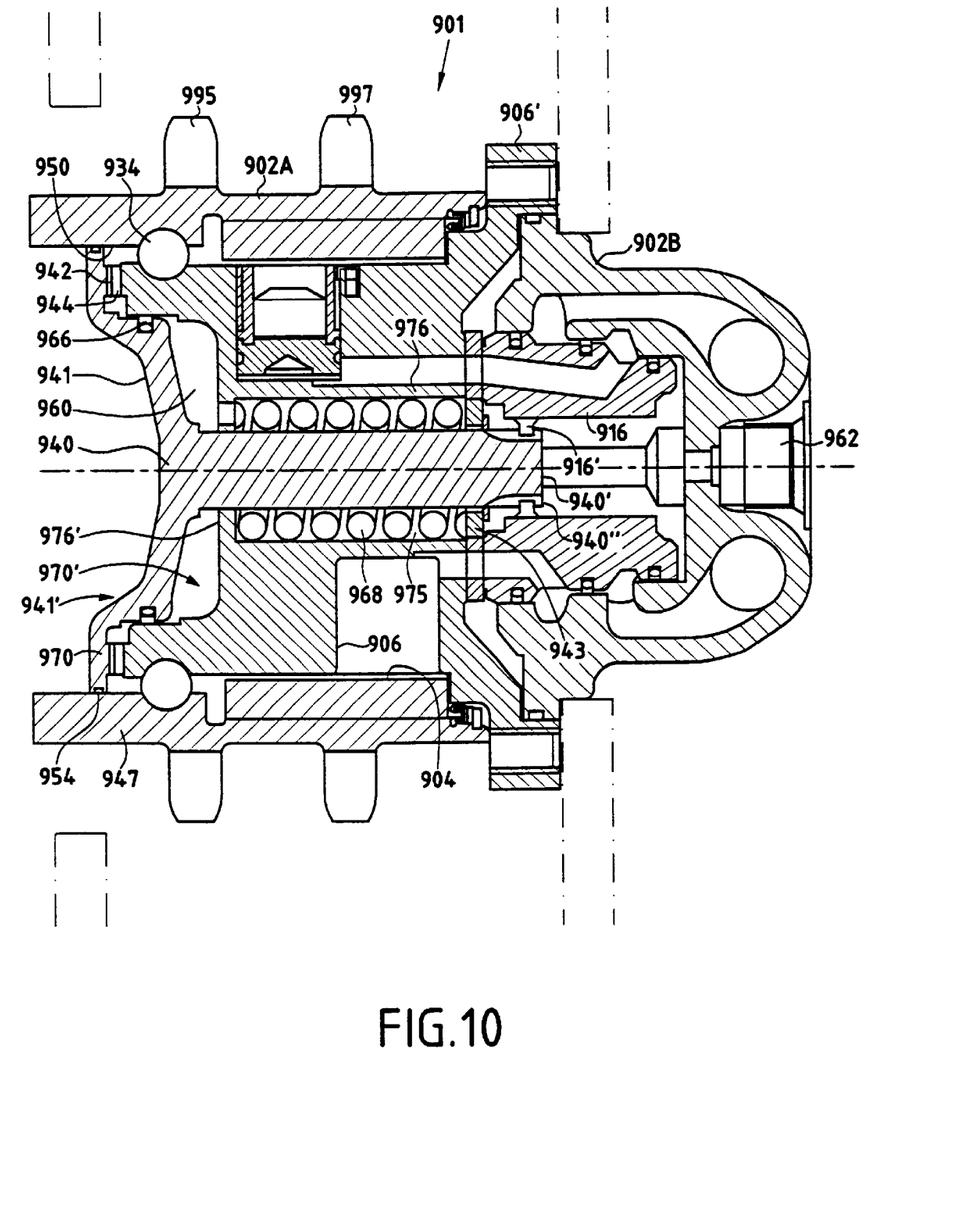
FIG. 10 is a fragmentary axial section view of a variant embodiment of the motor shown in FIG. 9.

FIG. 10 also shows the invention as applied to a motor 901 having a rotary casing. For example, in this motor, the casing carries sprockets 995 and 997. The cylinder block 906 is prevented from rotating and may be fixed to the chassis of a vehicle via a flange 906' that is provided on it and that projects from the casing. The casing comprises a first portion 902A which is disposed around the cylinder block, and extends to the flange 906', and a second portion 902B which forms the distribution cover and which may also be fixed to the chassis of the vehicle. The casing is supported to rotate relative to the cylinder block by roller bearings 934, e.g. by ball bearings.

As in the motor shown in FIG. 8, the braking system is disposed on that side of the cylinder block which is further from the distributor 916. The brake piston is formed by a shaft 940 which is provided with a substantially radial flange 941. The shaft 940 passes through the cylinder block 906 and is provided with an end which extends into a central axial bore of the distributor 916.

The coupling collar 947 is formed by an end portion of the portion 902 of the casing and it is made integrally therewith. The portion 902A carries the cam 904. The internal coupling surface is formed on the internal periphery 950 of the collar.

The external coupling surface 954 is formed on the axial surface of the end of the flange 941. These surfaces 950 and 954 have coupling profiles that are preferably formed by the undulations, which make it possible to constrain the shaft 940 to rotate with the casing.

It can be noted that, at its end 940' that extends into the distributor 916, the shaft 940 is provided with fluting 940" which co-operates with fluting 916' in the distributor so as to constrain the distributor to rotate with the shaft and thus with the casing.

The first braking means (the teeth 942) are formed on that radial face of the flange 941 which faces the cylinder block. The second braking means (the teeth 944) are formed on that radial face of the cylinder block which faces the flange 941.

More precisely, the second braking means 944 are formed on the radial face of the end of an annular extension 970 of the cylinder block which co-operates with the roller bearings 934. The brake release chamber 960 is formed between the flange 941 and the cylinder block 906. An indent 970' is provided in the radial face of the cylinder block that is further from the distributor, because of the presence of the annular axial extension 970.

The flange 941 is provided with a setback 941' which penetrates in part into the indent 970'. The internal periphery of the annular extension 970 and the external periphery of the setback 941' extend axially and are sealed relative to each other by gaskets 966. This configuration makes it possible for the piston 940 to slide axially relative to the cylinder block while defining the chamber 960.

A brake-release duct 962 which opens out in the distribution cover 902B makes it possible to feed the chamber 960. The brake release duct opens out in the central bore of the distributor which, naturally, is sealed relative to the outside and, insofar as the shaft 940 is not sealed relative to the central bore of the cylinder block (one or more communication bores may even be provided), it thus makes it possible to feed the chamber 960 which is permanently in communication with the annular bore of the distributor.

An annular space 975 is provided between the shaft 940 and the bore 976 in the cylinder block in which it is inserted. A helical spring 968 is disposed in the annular space, in which it abuts between firstly a radial wall 976' of the bore 976 and secondly a flange 943 which is keyed on the shaft 940, e.g. by a spring clip. The helical spring constantly returns the brake piston in the braking direction.

In any of the above-described embodiments, the brake release chamber may be formed between a first axial portion of the piston and a facing first axial portion of the coupling collar, having coupling undulations, and a second axial portion of the piston and a facing second axial portion, also having undulations, the second axial portions being offset relative to the first axial portions.

What is claimed is:

1. A hydraulic motor comprising:
   a casing;
   a reaction member integral with or secured to the casing and having an internal periphery that defines a reaction profile;
   a cylinder block which is mounted so that the cylinder block and the reaction member rotate relative to each other about an axis of rotation, the cylinder block comprising a plurality of piston-and-cylinder sets comprising cylinders and pistons, disposed radially relative to the axis of rotation and suitable for being fed with fluid under pressure;
   an internal fluid distributor constrained to rotate with the casing about the axis of rotation, and provided with distribution ducts that can put the cylinders in communication with fluid feed and exhaust ducts; and
   a braking system comprising first and second braking means constrained to rotate respectively with the casing and with the cylinder block about the axis of rotation, a brake piston having a substantially radial active braking face to which a brake member is secured, said piston being suitable for taking up both a brake-releasing position and a braking position in which said piston urges the first and second braking means into braking engagement so as to prevent the cylinder block and the casing from rotating relative to each other, and means for displacing the brake piston between said braking and brake-releasing positions;
   said brake piston being constrained to rotate with the casing about the axis of rotation and the brake member which is secured to the active braking face of said piston being a first brake member belonging to the first braking means.

2. A motor as claimed in claim 1, including a coupling collar which forms a portion of the casing and which has an internal axial face with which an external axial face of the brake piston co-operates to key said piston so that the latter is constrained to rotate with the casing, said internal and external axial faces having coupling profiles suitable for this purpose.

3. A motor according to claim 2, wherein the coupling collar is constituted by an axial extension of the reaction member, which extension is integral with said reaction member.

4. A motor as claimed in claim 2 or 3, wherein the reaction profile of the reaction member is formed by undulations, and wherein the coupling profiles are also formed by undulations, the trough portions of the undulations of the coupling profile of the internal coupling face extending axially in register with at least some of the trough portions of the undulations of the reaction member.

5. A motor as claimed in claim 1, wherein a second brake member belonging to the second braking means is integral with an end face of the cylinder block which extends facing the active face of the brake piston.

6. A motor as claimed in claim 1, wherein a second brake member belonging to the second braking means is secured to an end face of the cylinder block which extends facing the active face of the brake piston.

7. A motor as claimed in claim 1, wherein a second brake member belonging to the second braking means is integral with a flange which equips a shaft keyed so that it is prevented from rotating relative to the cylinder block.

8. A motor as claimed in claim 1, wherein the first and second braking means respectively comprise a first series of positive clutch teeth and a second series of positive clutch teeth, the first series of teeth being integral with the active face of the brake piston.

9. A motor as claimed in claim 8, including a coupling collar which forms a portion of the casing and which has an internal axial face with which an external axial face of the brake piston co-operates to key said piston so that the latter is constrained to rotate with the casing, said internal and external axial faces having coupling profiles suitable for this purpose, wherein the brake release chamber is formed between two stepped axial portions belonging to the coupling collar, and two stepped axial portions belonging to the brake piston, a first sealing gasket being disposed between the first axial portion of the collar and the facing first axial portion of the brake piston, while a second sealing gasket is disposed between the second axial portion of the collar and the facing second axial portion of the brake piston.

10. A motor as claimed in claim 9, wherein the axial portions of the coupling collar and of the brake piston between which the brake release chamber is provided are annular, the first axial portion of the collar being connected to the coupling internal axial face of said collar via a setback, while the first axial portion of the brake piston is connected to the coupling external axial face of said piston via a shoulder.

11. A motor as claimed in claim 9, wherein the coupling internal axial face and the coupling external axial face are respectively formed on the first axial portion of the coupling collar and on the first axial portion of the brake piston, and wherein the coupling profiles are undulating profiles.

12. A motor as claimed in claim 1, wherein the first and second braking means respectively comprise a first series of positive clutch teeth and a second series of positive clutch teeth, the first series of teeth being secured to the active face of the brake piston.

13. A motor as claimed in claim 1, wherein the means for displacing the brake piston between the braking position and the brake-releasing position comprise a brake release chamber suitable for being fed with fluid under pressure, said chamber having a substantially radial wall which is formed by a face of the position that faces the same way as the active face of said position, and which is offset axially relative to said active face.

14. A motor as claimed in claim 1, wherein the braking system comprises mechanical brake release means having at least two sets, each of which includes an axial tapped hole provided in the brake piston and opening out in a substantially radial face of the piston, which face is opposite from the first braking means, and an axial bore provided in a substantially radial portion of the casing, which portion is situated facing the brake piston and aligned with the axial tapped hole of said piston, each of said sets further including a brake release screw suitable for being inserted through the axial bore in the casing and into the axial tapped hole in the brake piston.

15. A motor as claimed in claim 1, wherein the first and second braking means respectively comprise a first series of positive, clutch teeth and a second series of positive clutch teeth, the motor including means for measuring a speed of rotation thereof, which means comprise a speed detector received in an element of the stator of the motor and facing that one of the first and second series of teeth which is constrained to rotate with the rotor of the motor.

16. A motor as claimed in claim 1, provided with a through axial passageway which is defined in the region of the distributor by a hollow cylindrical sleeve whose first axial end situated on a first side of the distributor is connected in sealed manner to the wall of a through axial bore provided in the cylinder block and aligned with the sleeve, and whose second axial end situated on the other side of the distributor is connected in sealed manner to the wall of a through axial bore in the casing.

* * * * *